June 19, 1928.

E. CRAIG 1,674,034

MACHINE FOR MAKING BASKETS

Filed March 14, 1924    8 Sheets-Sheet 1

Inventor:
Edward Craig

June 19, 1928.  
E. CRAIG  
1,674,034  
MACHINE FOR MAKING BASKETS  
Filed March 14, 1924  
8 Sheets-Sheet 2

Inventor:  
Edward Craig

June 19, 1928.

E. CRAIG 1,674,034

MACHINE FOR MAKING BASKETS

Filed March 14, 1924

Inventor:
Edward Craig
by Arthur H. Durand
Atty.

June 19, 1928.

E. CRAIG 1,674,034

MACHINE FOR MAKING BASKETS

Filed March 14, 1924

Inventor:
Edward Craig
By Arthur H. Durand
Atty.

June 19, 1928. 1,674,034
E. CRAIG
MACHINE FOR MAKING BASKETS
Filed March 14, 1924 8 Sheets-Sheet 5
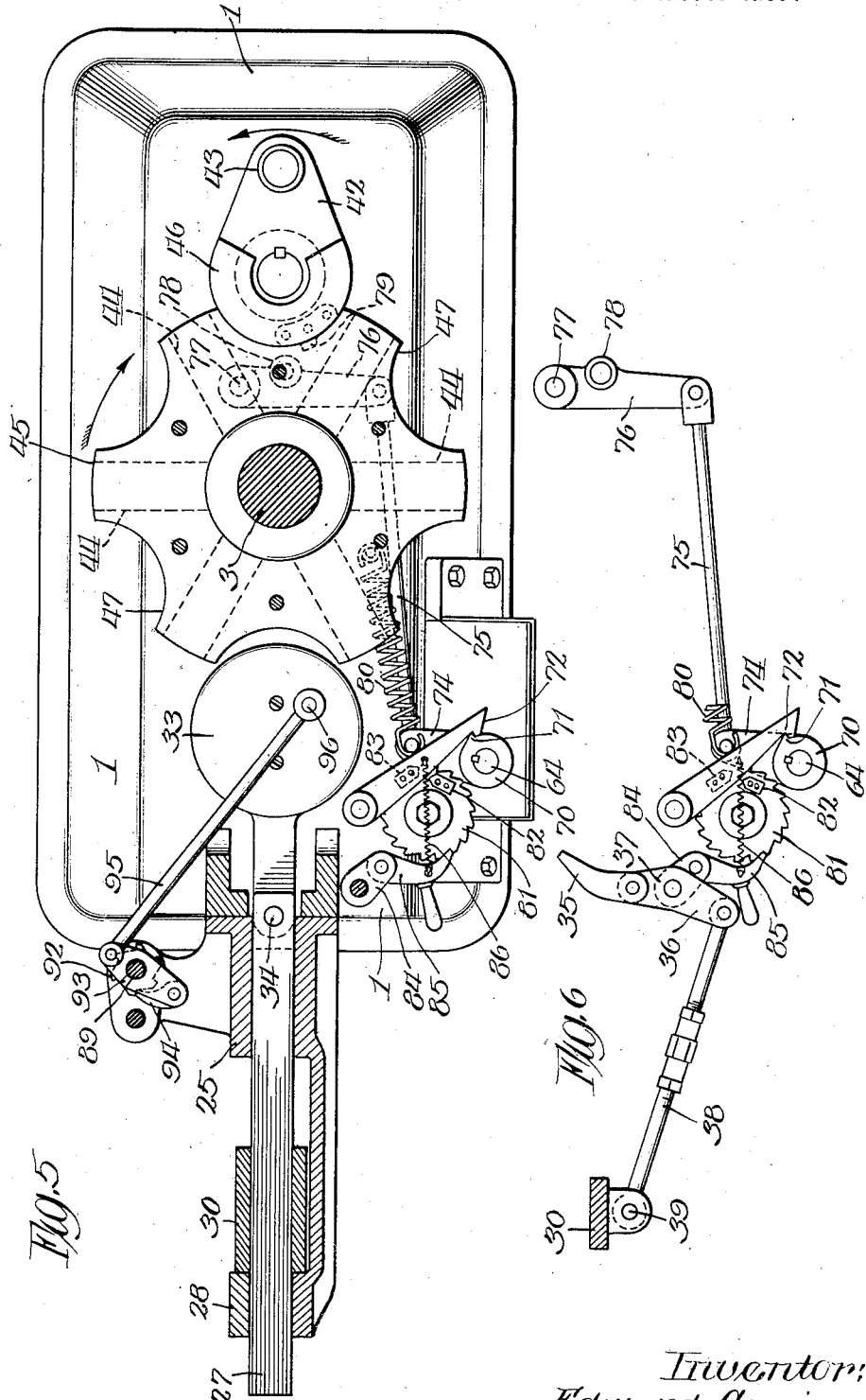
Inventor:
Edward Craig
by Arthur H. Durand
Atty.

June 19, 1928.
E. CRAIG
1,674,034
MACHINE FOR MAKING BASKETS
Filed March 14, 1924
8 Sheets-Sheet 6
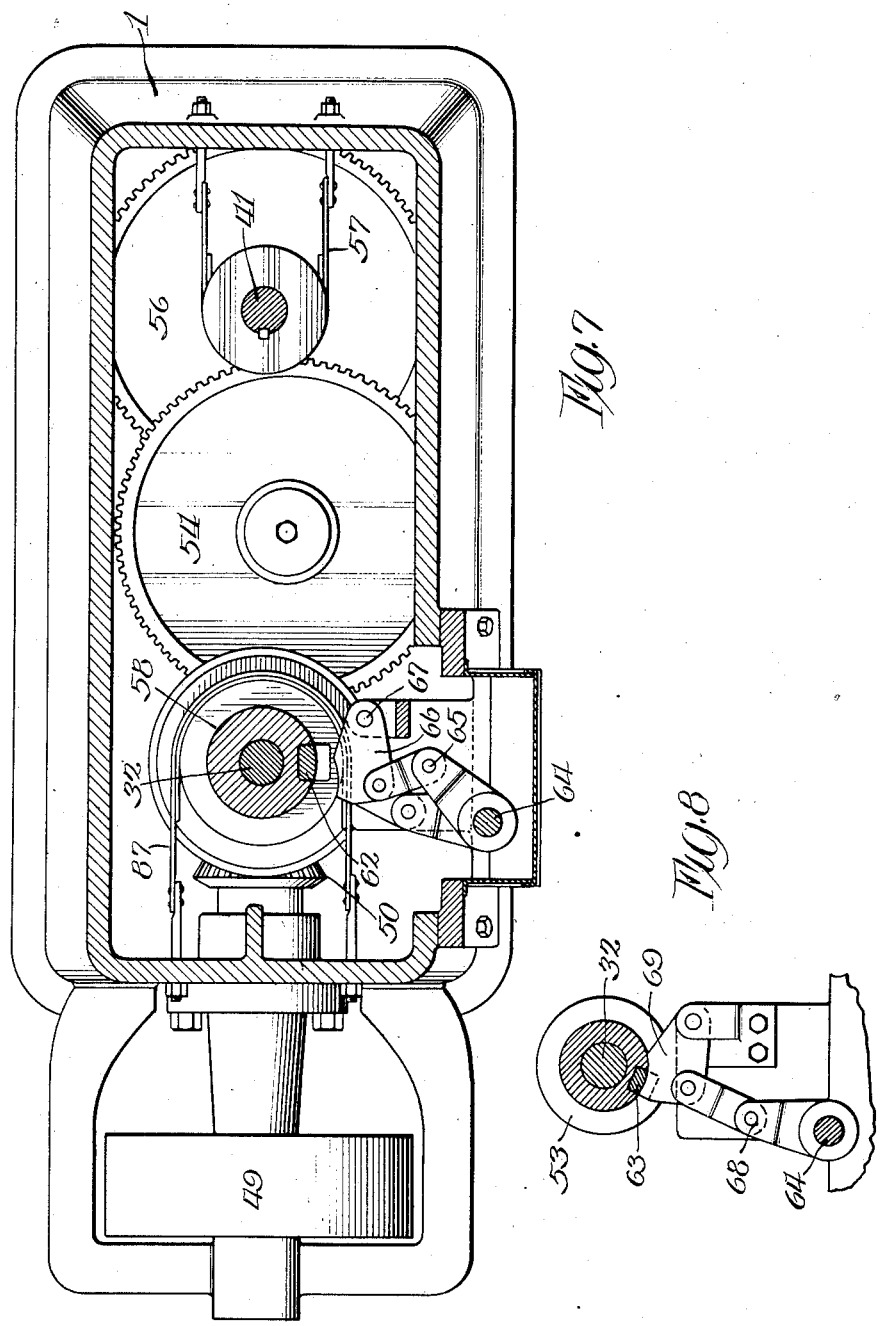
Inventor:
Edward Craig
By Arthur H. Durand
Atty.

June 19, 1928.
E. CRAIG
1,674,034
MACHINE FOR MAKING BASKETS
Filed March 14, 1924
8 Sheets-Sheet 7
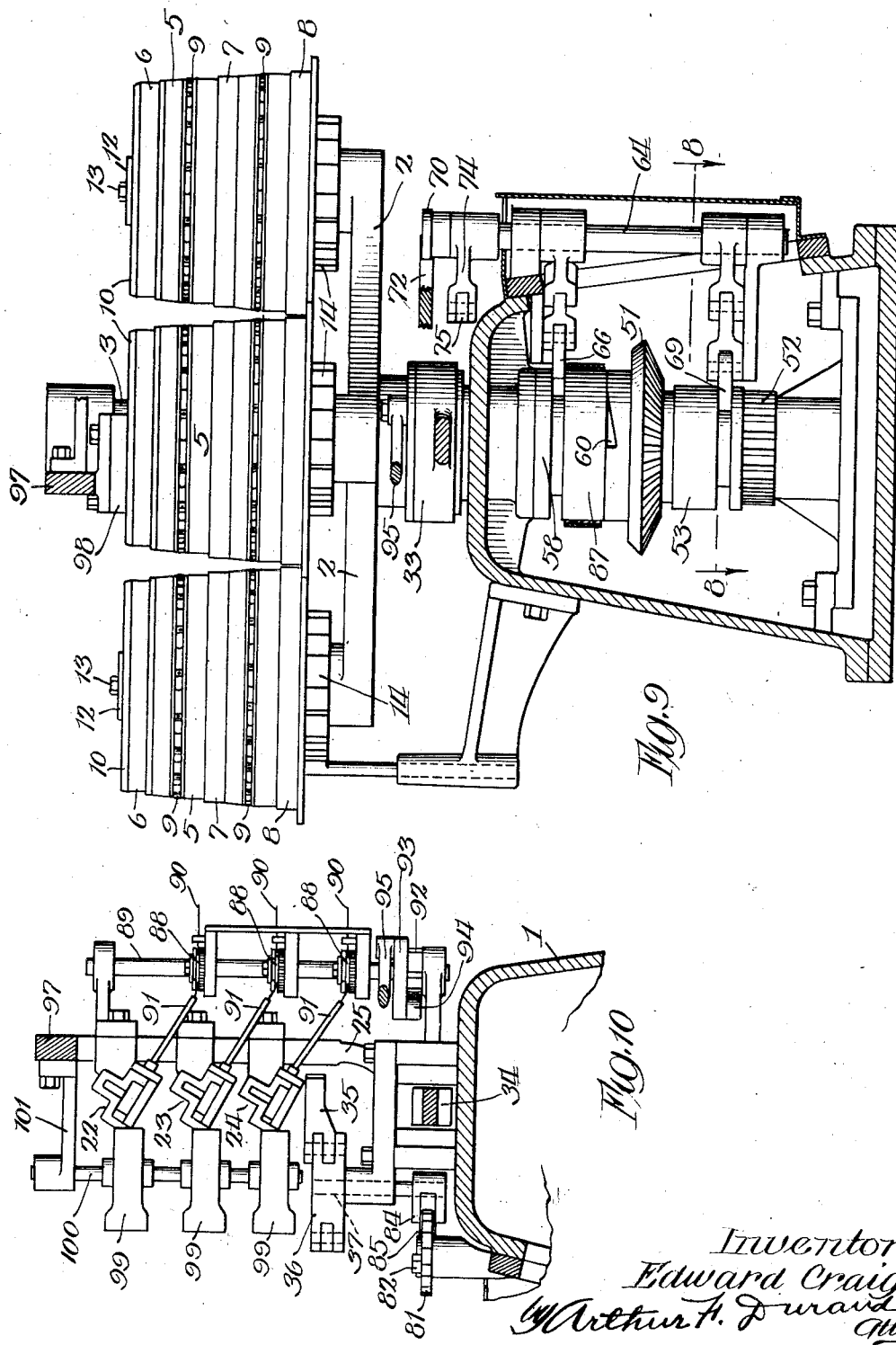

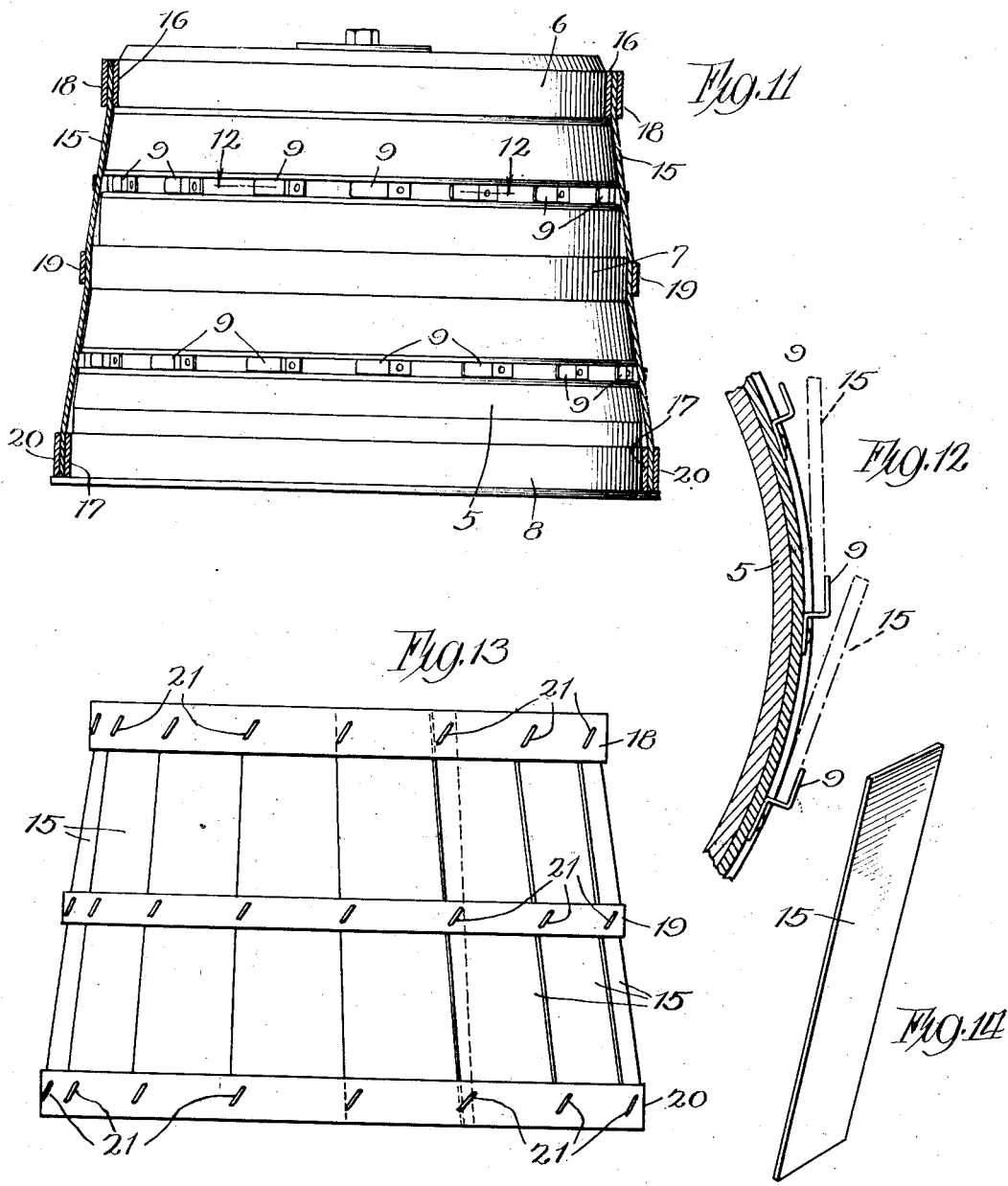

Patented June 19, 1928.

1,674,034

UNITED STATES PATENT OFFICE.

EDWARD CRAIG, OF ST. JOSEPH, MICHIGAN, ASSIGNOR TO SARANAC AUTOMATIC MACHINE CORPORATION, OF BENTON HARBOR, MICHIGAN, A CORPORATION OF DELAWARE.

MACHINE FOR MAKING BASKETS.

Application filed March 14, 1924. Serial No. 699,233.

This invention relates to machinery for making bushel baskets, or baskets of other sizes of the same general shape and character, having both ends thereof left open, when the basket is made, whereby the basket can be filled either through the top or the bottom thereof, and whereby two closures or covers, one forming the top and the other the bottom, can thereafter be applied to pre10 pare the basket for filling, and to finally close the basket after it is filled. Baskets of this kind are frusto-conical in shape, being tapered somewhat, and have their sides formed of staves reinforced by means of hoops, which are spaced apart and stapled thereto, or otherwise fastened in place, thereby to form a strong frusto-conical basket body, which is open at both ends, but which is adapted to be closed in the manner stated.

Generally stated, the object of the invention is to provide an improved construction and arrangement whereby baskets of this kind can be made on a form, and whereby the baskets can be removed easily from the form, after the form and the stapling mechanism have been separated sufficiently for this purpose, notwithstanding the frustoconical or tapered form of each basket, this particular form and shape making it diffi30 cult, if not impossible, to remove the basket from the form under certain conditions, as will hereinafter more fully appear.

Another object is to provide an improved construction and arrangement whereby an automatic machine is provided for the building and stapling of baskets of this kind, so that one basket is being stapled while another is being assembled on another form, and whereby each form will be automati40 cally rotated when it arrives in operative relation to the stapling mechanism, thereby to present successive sides of the assembled basket materials to the stapling mechanism, in order that the reinforcing hoops may be bent around the basket and stapled thereto by successive staples driven in each hoop.

It is also an object to provide certain details and features of construction and combinations tending to increase the general efficiency and the desirability of a basket making machine of this particular character.

To the foregoing and other useful ends, the invention consists in the matters hereinafter set forth and claimed, and shown in the accompanying drawings, in which,—

Fig. 5 is a horizontal section on line 5—5 in Fig. 3.

Fig. 6 is a detail view, showing certain parts of the machine.

Fig. 7 is a horizontal section on line 7—7 in Fig. 3.

Fig. 8 is a detail sectional view.

Fig. 9 is a vertical section on line 9—9 in Fig. 2.

Fig. 10 is a vertical section on line 10—10 in Fig. 2.

Fig. 11 is an enlarged side elevation of one of the basket forms, showing a basket thereon, in section, and illustrating the way in which the basket is formed or shaped on the frusto-conical form.

Fig. 12 is an enlarged detail, horizontal section on line 12—12 in Fig. 11.

Fig. 13 is a side elevation of one of the frusto-conical bushel baskets made on said machine, or baskets of other sizes, it being obvious that the invention is not limited to any particular size, notwithstanding that this form of basket is perhaps used more for bushel baskets or half-bushel baskets than for other sizes.

Fig. 14 is a perspective of one of the staves of veneer from which the side walls of the basket are made.

Figure 1:
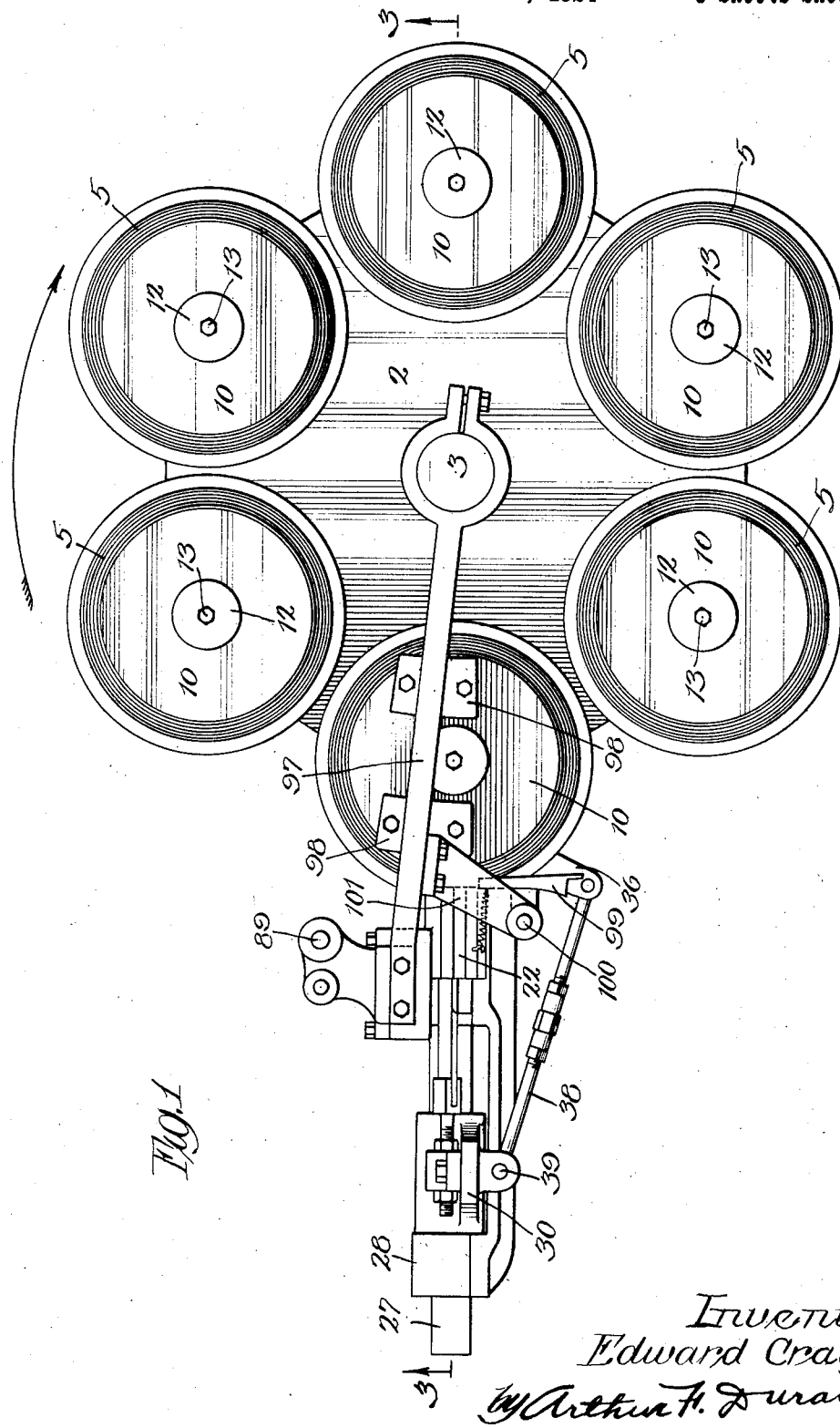
Fig. 1 is a plan view of a basket making machine involving the principles of the invention.

As thus illustrated, the invention comprises, preferably, a hollow base or body 1, upon the top of which is mounted a turntable 2 adapted to revolve or rotate about the vertically disposed axis member 3 which has its lower end fixed in the top of said base. Said turntable may be of any suitable or approved form or shape or size, but is preferably provided with a plurality of vertically disposed axis members 4, arranged equidistantly apart, and at a uniform distance from the central axis member 3, so that all of said axis members are parallel and vertically disposed. A basket form 5 is mounted to rotate on each axis member 4, and as the forms are all alike, a descripton of one will be suciffient for all. Each form, therefore, comprises a frusto-conical or tapered shell arranged with its smaller end uppermost, and provided with three rings 6, 7 and 8 of different sizes or diameters. In addition, the outer tapered surface of the form is provided with two circular rows of holders or clips 9, all extending in the same direction, as shown. The upper end of the form has a plate 10 which is secured by screws 11 to the upper edges of the form, and which is clamped down upon the axis member 4 by a plate 12 held in place by a screw or bolt 13 inserted as shown. The under side of each form is rigid with a ratchet wheel 14 for the intermittent rotation of the form, as will hereinafter more fully appear.

Each form thus constructed is adapted to receive the basket materials as follows:

The staves 15 are inserted in overlapped relation, as shown in Figs. 12 and 13, under the holders or clips 9, while the form is in a position remote from the place where the hoops of the basket are to be stapled thereto. For the construction of the basket, inner hoops 16 and 17 are first applied to the rings 6 and 8, respectively, and then the staves are placed in position as shown and described. Thereafter hoop strips are applied externally to form the three outside hoops 18, 19 and 20, as shown and described. Thus a frusto-conical basket is formed which is open at both ends thereof, the basket being built and stapled together with its smaller end uppermost, so that the immediate result of the stapling operation is a frusto-conical basket which is open at both ends thereof and which has been built and stapled about a vertically disposed axis.

For the stapling of the hoops to the basket and for the insertion of the staples 21 for this purpose, through each outside hoop, the three staplers 22, 23 and 24 are employed, being arranged parallel and horizontally at one side of the machine, the stationary casings or housings of these staplers being mounted in a suitable manner on the stationary, vertically disposed member 25, which is supported by the bracket 26 at one side of the hollow base 1 previously mentioned. It will be seen that the three staplers are arranged at different distances from the axis member 4, because of the difference in diameter of the different hoops, the uppermost stapler 22 being an operative distance from the ring 6, the next stapler 23 being a similar distance from the ring 7, and the lowermost stapler 24 being a similar distance from the ring 8, whereby the three staplers are operative to insert staples through the three hoops 18, 19 and 20 of different diameters, and through the staves 15 and the hoops 16 and 17, causing the points of the staples to be clinched upon the rings 6, 7 and 8 of the form. For the operation of the staplers a reciprocating and horizontally disposed bar 27 is mounted in the guides 28 and 29 of the aforementioned bracket 26, and a vertically disposed arm 30 is fiexd on this endwise reciprocating bar 27, in the manner shown. The staplers have their outer end portions 31 adjustably secured to this arm 30, so that the staple formers and drivers of the staplers will be operated in the well known manner, it being understood that these staplers are of any suitable known or approved form. For the reciprocation of the bar 27 a vertical shaft 32 is provided, within the housing 1 previously mentioned, and the upper end of this shaft is provided with an eccentric device 33 which is connected by a pivotal connection 34 with the adjacent end of said bar 27, whereby rotation of this shaft will cause this bar 27 to reciprocate endwise in its guides 28, 29, previously mentioned.

For the rotation of each basket form, in operative relation to the stapling mechanism, a ratchet dog 35 is provided, which ratchet dog is pivoted on the end of an arm 36, the latter being pivoted on a stationary portion of the machine at 37, as shown. The other end of this arm 36 is connected by a rod 38 with a pivot 39 on the arm 30 previously mentioned, whereby reciprocation of the stapling mechanism will cause the dog 35 to be actuated in a manner to intermittently rotate the ratchet wheel 14 previously mentioned, when any such ratchet wheel is brought into operative relation to said dog by the rotation of the turntable. A spring 40 is preferably applied to the dog 35 in a manner to keep the dog in engagement with the ratchet wheel, and hence the ratchet wheel will be rotated one notch each time the bar 27 moves outward, and then the dog 35 will be drawn back into engagement with the next tooth when the bar 27 moves toward the shaft 32, because of the toggle joint or pivotal connection between the arm 36 and said ratchet dog, in a manner that will be readily understood.

Thus the staves of the basket are assembled in position on one form while another form is rotating in operative relation to the stapling mechanism. The operator or attendant will build the side walls of the basket by properly assembling the staves on an empty form, thus loading the form and putting it in condition to move around and finally assume a position in front of the stapling mechanism. This building operation, therefore, occurs at a point remote from the position which the basket assumes during the stapling operation, and the loosely assembled or unstapled staves forming the side walls are moved from the assembling position to the stapling position by lateral motion thereof, so that the vertically disposed axis about which the staves are assembled is moved laterally some distance until the form upon which the staves are assembled is in position to cooperate with the stapling mechanism to bend and secure the outer hoops to the basket. Of course, as stated, before the staves are placed on a vacant form, the two inner hoops are placed thereon, but the assembling operation is performed about a vertically disposed axis, and by rotating the form to expedite the work of the person doing the assembling, so that the immediate result of the assembling operation is a loose structure of frusto-conical shape having its smaller end uppermost, and whereby it becomes easy to move the assembled staves without danger of displacement thereof into the position where the stapling operation is performed.

For the intermittent rotation of the turntable 2, in order to successively present the different basket forms to the stapling mechanism, a vertical shaft 41 is provided, mounted in suitable bearings within the body 1 previously mentioned. At its upper end this shaft has a fixed arm 42 provided at its outer end with a roll 43 for engaging the straight grooves 44 in the member 45 secured to the under side of the turntable, these grooves being radial. The top of said arm is provided with a segmental portion 46 for engaging the notches 47 in the periphery of the member 45, whereby the turntable will be rotated in the direction indicated by the arrow, when such arm 42 is rotated in the direction indicated by the arrow adjacent thereto. While the segment 46 is rotating in one of the notches 47, the turntable will stand still, but as soon as the open side of the segment is turned around, so that the roll 43 enters the next slot or groove 44, the turntable will then be rotated until another notch 47 is brought into position to engage the cylindrical surface of the segment 46, so that the turntable always stops in the position shown in Fig. 5 of the drawings, with the arm 42 in the position shown. Thus, while one form is being rotated in front of the stapling mechanism, the turntable is stationary, so that some attendants or operatives can be placing hoops on the empty forms, while other attendants or operatives will then place staves against said hoops, thus keeping the basket forms loaded in the desired manner. As soon as the basket is completed, by the stapling of the hoops thereto, the shaft 41 then begins to rotate, and the shaft 32 stops, so that the stapling operation is discontinued long enough to permit the turntable to rotate and bring a freshly loaded basket form into position in front of the stapling mechanism.

Now for the purpose of insuring the operation described, for the purpose of driving the machine, the horizontal shaft 48 is provided and mounted in suitable bearings on the body of the machine, as shown. This shaft has a pulley 49 on the outer portion thereof, to communicate driving power to the shaft, and the inner end of the shaft has a bevel pinion 50 keyed thereto. The bevel gear 51 engages the pinion 50 and is loose on the shaft 32, whereby power can be taken from this gear wheel 51 to operate the stapling mechanism, by operating the previously mentioned eccentric device 33, and whereby power can also be taken from this gear 51 to operate the shaft 41 previously mentioned. For the operation of the shaft 41 a loose pinion 52 is provided on the shaft 32, rigid with the clutch member 53, and gears 54, 55 and 56 transmit power from this pinion 52 to the shaft 41, at gradually reduced speed, thereby to rotate the shaft and rotate the turntable at the proper time. To prevent the shaft 41 from being turned too far, a friction brake 57, of any suitable character, is preferably applied thereto. For transmitting power from the gear 51 to the eccentric device 33, a clutch member 58 is mounted above said gear wheel, on the shaft 32, and made rigid with the eccentric 59 of said eccentric device, whereby when this clutch member 58 is rotated the eccentric 59 will be rotated to actuate the bar 27 previously mentioned. The gear 51 has an upper slot 60 and a lower slot 61, and the member 58 has a vertically movable clutch pin 62, while the lower clutch member 53 has a similar movable clutch pin 63, this being a well known form of clutch. The pin 62 is adapted to engage the slot 60, while the pin 63 is adapted to be moved upward to engage the slot 61, and hence the gear 51 can be locked either to the clutch member 58 or to the clutch member 53, by the operation of these clutch devices. For the operation of these clutch devices a vertical rock shaft 64 is provided having a toggle connection 65 with the member 66, which is pivoted at a stationary point at 67, and which is shaped to engage the pin 62 to force the latter downward into the slot or groove 60, this pin 62 having a spring (not shown) for keeping it normally raised. The shaft 64 has a similar toggle connection 68 for actuating the member 69 which engages the pin 63, at the proper time, thereby to force this pin upward against its spring (not shown) into the slot or groove 61, whereby the rocking of the shaft 64 in one direction will close one clutch and open the other, while rocking of the shaft in the opposite direction will open the one clutch and close the other, thereby to permit operation of the stapling mechanism while the turntable stands still, and to permit rotation of the turntable while the stapling mechanism is not operating, for no staples must be formed and driven during the time that a freshly loaded form is being brought into position to be operated upon by said mechanism. This is a common form of clutch mechanism, and by means of these two clutches it will be seen that the machine can be controlled to rotate the turntable and operate the stapling mechanism and rotate the forms individually, in the manner previously shown and described.

However, as a matter of further and special improvement, the actuation of the rock shaft 64 is preferably automatic, and for this purpose the upper end of the shaft 64 is provided with a wheel 70 having a single tooth 71 adapted to be engaged by the hook 72 which is pivoted upon a stationary portion of the machine at 73, and this wheel or hub-like portion 70 is rigid with an arm 74, to which latter is connected the rod 75 leading to the pivot arm 76, which latter is pivoted upon the body frame at 77 to swing in a horizontal plane. This arm 76 has a roll 78 suitably mounted thereon, adapted to be engaged by the cam projection 79 on the under side of the arm 42, whereby this arm, just before it stops in the position shown, will cause the projection 79 to engage the roll 78 and thereby exert a push on the rod 75 sufficient to move the arm 74 a distance. This will turn the rock shaft 64 sufficiently to open the turntable clutch 53 and close the stapler clutch 58, so that the rotation of the shaft 41 will stop and the rotation of the eccentric member 59 will be started, automatically, in this manner. A spring 80 connects the arm 74 with a stationary portion of the machine, so that the tooth 71 is caught and held by the hook 72, in the manner shown, while the stapling mechanism is in operation. A ratchet wheel 81 is mounted on the body frame adjacent the hook 72, and is provided with a cam portion 82 disposed in position to engage the projection 83 on the bottom of the hook 72, whereby to disengage the hook from the tooth 71 when the stapling operation is finished, thus allowing the spring 80 to pull the arm 74 over in a direction to rock the shaft 64, and thereby open the stapler clutch and close the turntable clutch. For this purpose, therefore, the arm 36 previously mentioned is rigid with a shorter arm 84, to which is pivoted a ratchet dog or pawl 85 for engaging the teeth of the ratchet wheel 81, whereby the actuation of the previously mentioned pawl or ratchet dog 35 is accompanied by an actuation of the pawl 85 to rotate the ratchet wheel 81, a spring 86 being provided to connect the pawl 85 with the hook 72, so that these two elements are yieldingly maintained in engagement with the wheel 81 and the wheel or hub portion 70 previously mentioned.

When the stapling operation is finished, the parts are so constructed, and the operations are so timed, that the cam portion 82 will strike the projection 83, thus releasing the hook 72 from the tooth 71, and thereby permitting the spring 80 to rock the shaft 64 in the manner stated, thus automatically stopping the stapling mechanism and starting the rotation of the turntable. Thus the means for rotating the turntable in an intermittent manner are provided with means to automatically control the stapling mechanism, so that when the turntable stops, the arm 42 will be automatically stopped and the stapling mechanism and the means for rotating the form in front of the stapling mechanism will be automatically started. Two clutches are provided, one for transmitting power to the stapling mechanism, the other for transmitting power to the turntable, and the two cam devices 79 and 82 conjointly control the operation of the stapling mechanism and the turntable, as well as the rotation of the basket form in front of the stapling mechanism, for the form which occupies this position cannot rotate except when the stapling mechanism is reciprocated in the manner previously described. To insure the desired operation of the stapling mechanism, and the proper rotation of the basket form in front of the staplers, a friction brake 87, of any suitable character, is preferably applied to the stapler clutch member 58, in the manner shown.

Now wire must be fed to the staplers, of course, in order to form the staples, and this is preferably accomplished by means of the feed rolls 88, on the vertically disposed shaft 89, there being one of these feed devices for each stapler, so that the wires 90 are fed through the tubes 91 to their respective staplers. The lower end of the shaft 89 is provided with a ratchet wheel 92, and an arm 93 is adapted to oscillate on said shaft, one end of said arm having a ratchet dog or pawl 94 for engaging this ratchet wheel. The other end of this arm 93 is connected by a rod 95 to the pivotal point 96, which is eccentrically located on the top of the eccentric device 33, whereby rotation of this device will oscillate the arm 93 and thereby intermittently rotate the shaft 89 to feed the wires to the staplers at the proper time. Thus all three things are accomplished by the rotation of the shaft 32; first, the actuation of the staplers; second, the intermittent rotation of the basket form in front of the staplers, and, third, the actuation of the wire feed rolls to feed the wires to the staplers. It will be understood that these elements are so timed in their operations and in their relation to each other that the basket form is rotated the desired extent, and the staplers are then reciprocated to cut off lengths of wire and form these severed lengths into staples and insert them into the basket. Then the basket is rotated another step, and more wire is fed for the making of staples, and three more staples are inserted, or any suitable or desired number, depending upon the number of staplers employed, for while three staplers are shown, it is obvious that any suitable or desired number can be employed, depending upon the number of hoops to be applied to the basket, or upon other circumstances.

Now it is important that the basket form be rotated exactly the predetermined amount each time, and for this purpose the upper portion of the axis member 3 is preferably connected to the bracket member 25 by a horizontal beam 97, and brake shoes 98, of any suitable character, are applied to the under side of this beam to bear upon the top plate 10 of the basket form, whereby the basket form will always be stopped in the proper position to receive the staples.

Figure 2:
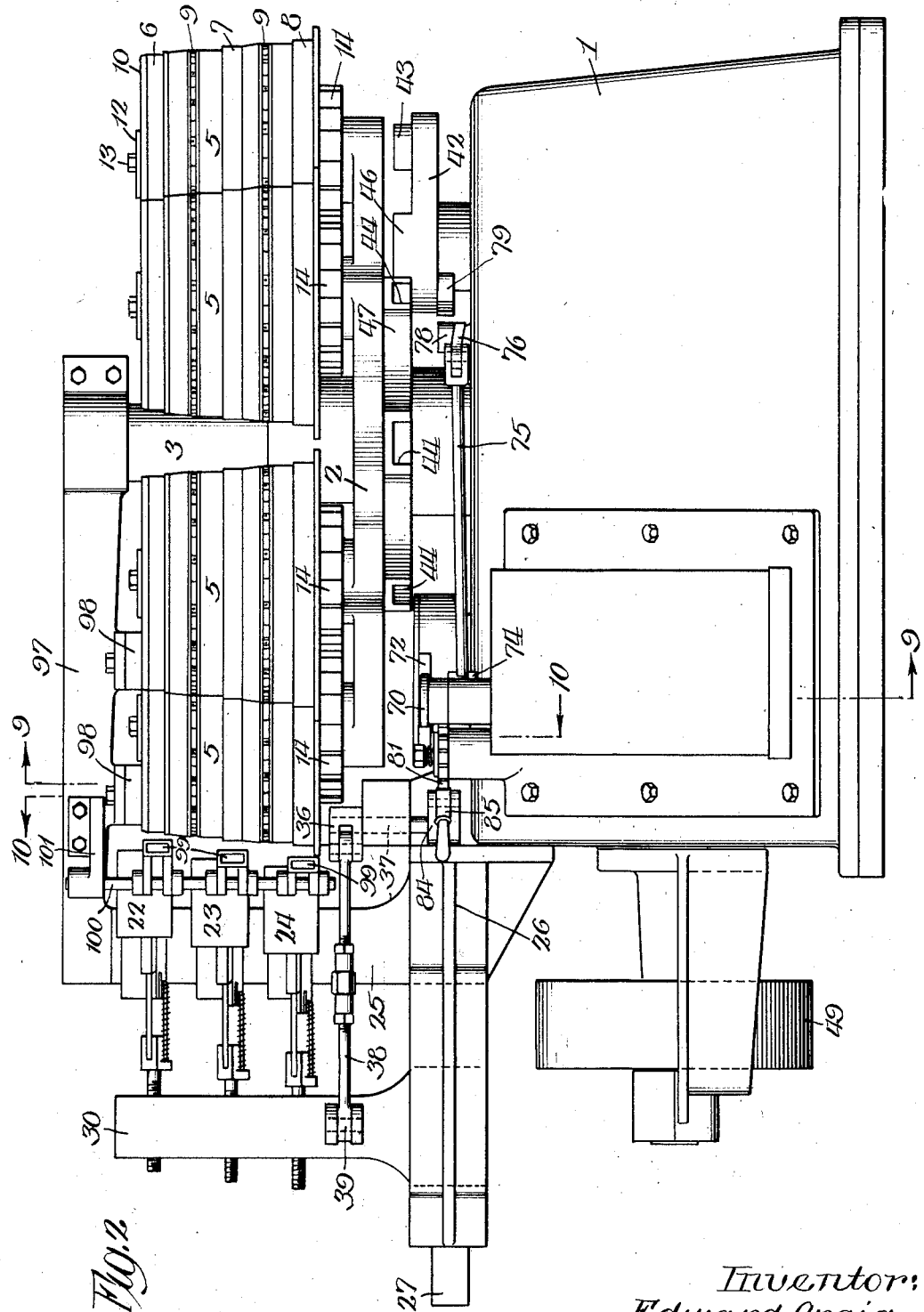
Fig. 2 is a front elevation of said machine.
Figure 3:
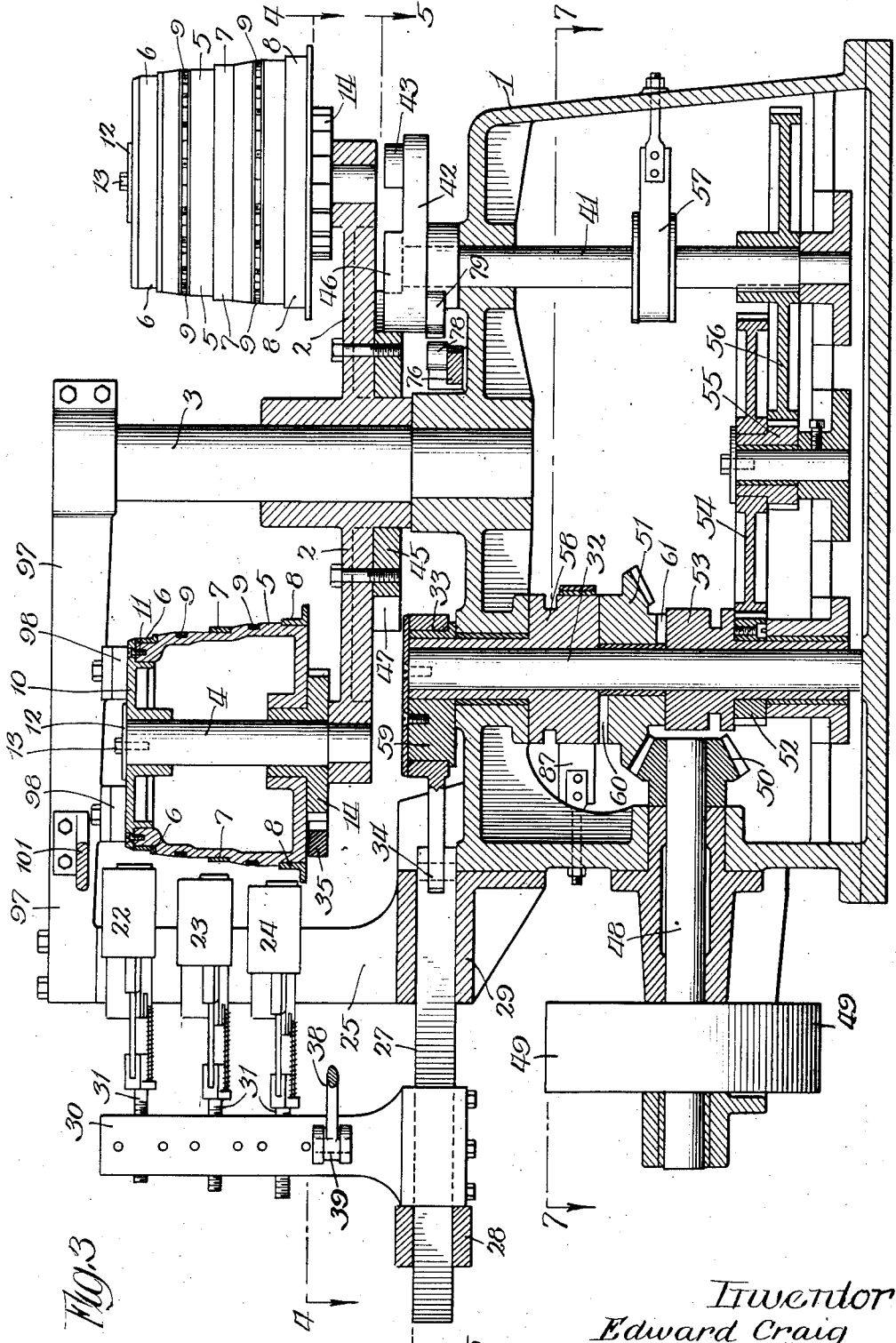
Fig. 3 is a longitudinal vertical section on line 3—3 in Fig. 1.
Figure 4:
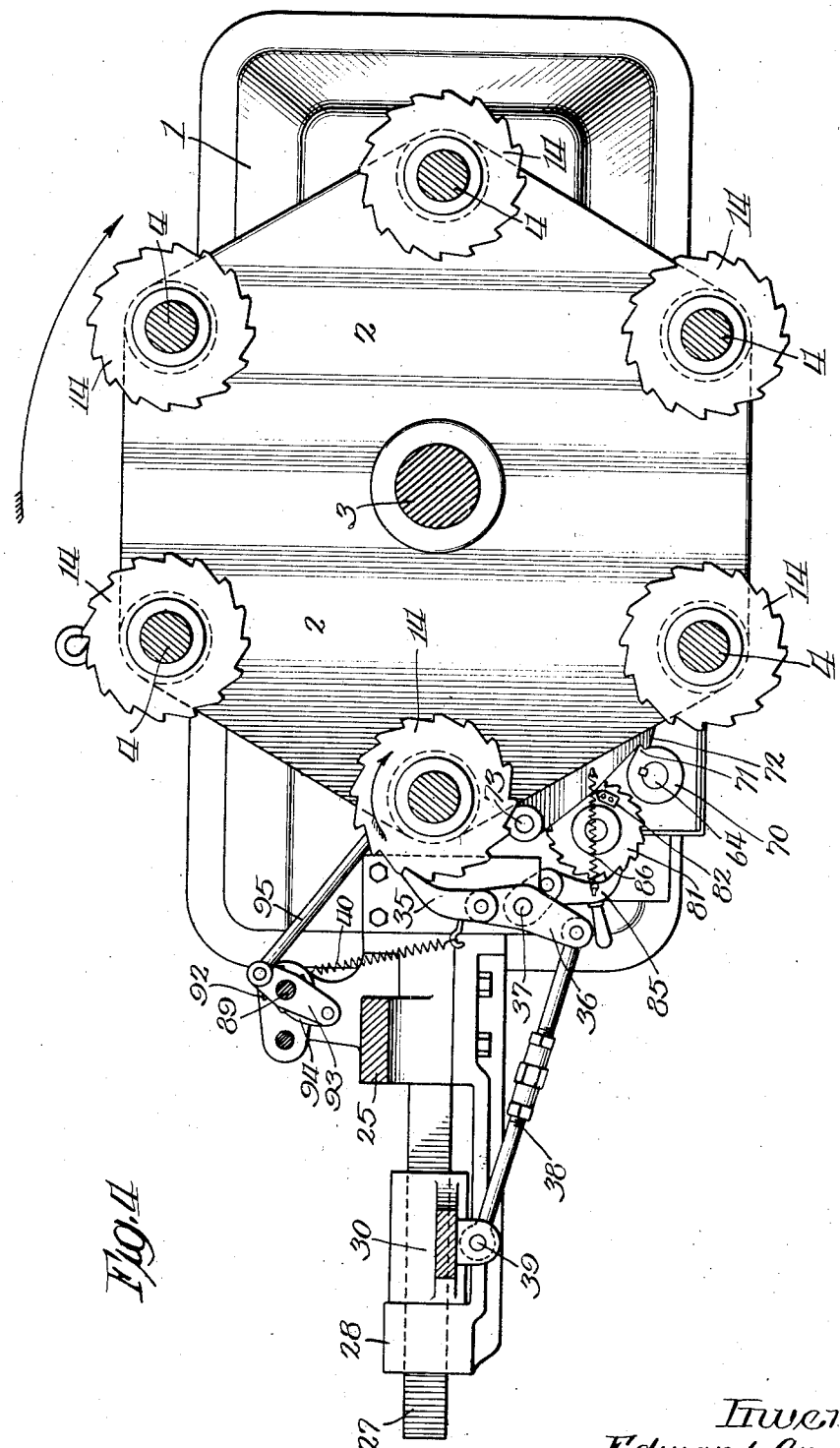
Fig. 4 is a horizontal section on line 4—4 in Fig. 3.

For the feeding of the hoop strips to the basket, between the staplers and the sides of the basket, guides 99 are provided, as shown, on a vertically disposed pivot bar 100, which latter is supported by a bracket 101 on the horizontal beam 97 previously mentioned. It will be seen that these tilting guides 99 can be of any suitable known or approved form, and are adapted to receive the hoop strips at their wider ends or mouths, as shown in Fig. 2, so that these hoop strips can be inserted between the basket and the adjacent ends of the staplers in position to receive the first staples. As soon as the first staples are driven in the ends of the hoop strips, the three strips will then feed automatically, as the rotation of the basket form will draw the hoop strips through the guides a distance each time the basket form is partially rotated, until finally the rear ends of these hoop strips will be lapped over and fastened upon the front ends of the strips, thus causing a complete hoop to be formed out of each hoop strip, with overlapping ends through which staples are inserted, and with intermediate staples placed at regular intervals along the encircling portions of each hoop.

Of course, any suitable means can be employed for controlling the transmission of power to the pulley 49, so that the shaft 48 can be started and stopped at will. However, while the shaft 48 is rotating the machine is in operation, and either the stapler clutch or the turntable clutch is closed, but not both, for with the automatic control shown and described only one clutch at a time can remain closed. The turntable stops itself, so to speak, and its actuating device 42 serves through the cam projection 79 to automatically start the operation of the stapling mechanism, as well as the rotation of the basket form in front of the stapling mechanism, and the operation of the wire feed devices previously described. Thus hoops are first put on empty forms, and then staves are inserted in place over these hoops, and then the partially assembled baskets are moved laterally and horizontally into position to receive the outside hoops and the staples therefor. Such method insures rapidity of production, and tends to insure against the making of imperfect baskets, inasmuch as the partially assembled baskets are moved with their smaller ends uppermost, sidewise, in a manner which tends to prevent any displacement of the loosely assembled materials before arriving in position to receive the staples. The baskets can be built with their smaller ends uppermost, partially, as described, and can be maintained in this position until they are finished, automatically, for at no time after partially assembling a basket is there any occasion to turn it into a position where its axis would be horizontal, or into a position where the staves would be in danger of falling off. The staves all lean or incline inwardly at their upper ends, in addition to being held in place by the clips or holders on each basket form, thus each basket form can be rotated about its vertical axis while being loaded, and it can then be moved bodily into position to receive the outside hoops and the staples therefor, thus insuring high speed production and tending to minimize the number of imperfect baskets. In fact, with the method shown and described, and with reasonably careful attendants or operatives, the machine can run continuously hour after hour without interruption and without any danger of imperfections in the baskets due to dislocation or disarrangement of the materials, for after assembling the inner hoops and staves there is then no step in the process or method which tends to produce any disarrangement of the materials thus assembled in readiness to be stapled together.

It will be seen, therefore, that two reasons are obvious why the basket, when finished, cannot be conveniently or easily removed from the basket form while the latter is still in operative relation to the stapling mechanism. First, of course, the staplers themselves are so close to the basket form, and are so arranged and in such position, that it would be somewhat inconvenient or difficult to pull the finished basket off from the form in this position. Second, the overhead bar which supports the friction devices that bear upon the top of the basket form would prevent the removal of the finished basket in this position. Therefore, in order not only to facilitate the loading of the basket form, but also the removal of the finished basket therefrom, the invention contemplates the lateral movement of the basket form from loading position to stapling position, and then from stapling position to the delivery position, at which latter position the finished basket can be easily removed by simply giving it a little twist to disengage the staves from the clips or holders on the form, and by then lifting the finished basket upward from the form. Thus the invention relates to the manufacture of baskets by machinery in which the basket form is exposed at its outer end, the upper end in this case, so that means may be provided, if desired, for engaging the exposed end of the basket form for any suitable or desired purpose, or for affording access thereto for any suitable or desired purpose, while the basket is still on the form. In the present case, as shown and described, the upper end of the basket form is left exposed and in position to engage the friction means shown and described, but the exposure of the end of form can be utilized for any suitable or desired purpose. Of course, the machine can be of any suitable or desired size, so that it will make bushel baskets or half-bushel baskets, or either larger or smaller baskets, but preferably of the kind shown and described, involving a tapered or frusto-conical body which is open at each end thereof.

It will be seen that the positioning of the basket forms, with their axes vertical, and with their smaller ends uppermost, facilitates the placing of the inside hoops on the forms and the assembling of the staves around the hoops. The smaller ends of the forms are thus not obstructed, in any way, so that the large top hoop and the smaller bottom hoop can be placed in position, as shown. Also, the staves lean inwardly, when they are assembled around the two inside hoops, and do not tend to fall away, but to the contrary hug the outside of the basket form, even if they were not held by the devices or means for receiving the edges of the staves. This facilitates the assembling, of the materials, and it will be observed that practically a complete basket is assembled, with the exception of the outside hoops, before the basket form and the materials thereon are moved into position in front of the staplers. Thus the staves are not fed to the work in front of the staplers, but to the contrary are assembled in position at a point more or less remote from the staplers, and are then brought in assembled condition into position for stapling.

What I claim as my invention is:

1. In a machine for making baskets, the combination of stapling mechanism, a basket form to support the basket, a movable support for said form, instrumentalities for operating said mechanism and causing intermittent rotation of the basket form, thereby to rotate the basket to present the different sides thereof to said stapling mechanism, power transmitting devices for causing movement of said basket form with the basket thereon into and out of operative relation to said stapling mechanism, by movement of said support, thereby to facilitate loading and unloading of the form, and automatic devices to automatically stop said mechanism and to bring into operation said power transmitting devices for causing movement of said support controlled by the actuation of said mechanism.

2. A structure as specified in claim 1, said instrumentalities by which the form is intermittently rotated comprising a ratchet wheel associated with the form, and including also a ratchet dog located in a stationary position and actuated by the motion of the stapling mechanism, whereby movement of said support under control of said automatic devices causes said ratchet wheel to move into and out of operative relation to said ratchet dog.

3. A structure as specified in claim 1, said support having one or more other basket forms mounted thereon, the members of the plurality of basket forms thus provided being adapted to be successively presented to said stapling mechanism, said automatic devices being timed therefor, whereby one form can be loaded while another form is being rotated in operative relation to the stapling mechanism.

4. A structure as specified in claim 1, said basket form being mounted to rotate about a vertical axis, and said stapling mechanism being arranged in a position to operate horizontally against the sides of the basket, whereby the basket thus under control of said automatic devices is held by gravity against axial displacement before and during the stapling thereof.

5. A structure as specified in claim 1, said form being frusto-conical in shape, and having means thereon to hold a frusto-conical basket which is open at both ends thereof, and said stapling mechanism comprising a plurality of staplers constructed and arranged to apply hoops of different diameters to the basket, whereby the staples thus driven under control of said automatic devices are closer together in one hoop than in another hoop.

6. A structure as specified in claim 1, said power transmitting devices comprising means for rotating said support about a vertically disposed axis parallel to the axis about which the form is rotated by said automatic devices.

7. A structure as specified in claim 1, said power transmitting devices comprising means thus under control of said automatic devices for causing intermittent rotation of said support, in combination with other forms of similar shape and character on said support, and provisions whereby said support has as many stationary and operative positions as there are basket forms mounted thereon, whereby the support is held stationary while each form is being rotated in operative relation to said mechanism.

8. A structure as specified in claim 1, said support comprising a turntable, in combination with at least one other similar basket form thereon, and said power transmitting devices comprising power transmitting means under control of said automatic devices and operative by lost motion therein to hold the support stationary while either basket form is being rotated in operative relation to said mechanism, and whereby the support is rotated a distance sufficient to move the finished basket to one side and substitute therefor the unstapled basket materials on the other form, so that either form can be loaded while the other form is co-operating with said mechanism.

9. A structure as specified in claim 1, said instrumentalities comprising an eccentric cam for reciprocating said stapling mechanism, under control of said automatic devices, and a ratchet device operated by the reciprocating motion of said mechanism to intermittently rotate said basket form.

10. A structure as specified in claim 1, said support having a plurality of said basket forms thereon, spaced equidistantly from each other, and said power transmitting devices for causing movement of said support including notches on the bottom of said support corresponding in number to the basket forms mounted thereon, a shaft having means to rotate in each notch without moving the support, under control of said automatic devices, having provisions for partially rotating the support to bring the next notch into engagement with said means, after the completion of each basket by said mechanism, and means for rotating said shaft.

11. In a machine for making a frusto-conical basket, the combination of an automatically rotatable basket form which is larger at one end than at the other, means on said form to hold the basket materials in place, stapling mechanism for inserting staples into the basket materials on said form, adapted to secure a plurality of hoops of different sizes to the outer surface of the basket, said mechanism comprising a plurality of staplers disposed at different distances from the axis of said form, because of the tapered shape of the basket, instrumentalities whereby said mechanism is operated and said basket form is rotated intermittently to present different sides of the basket to said mechanism, and devices whereby said basket form is movable laterally into and out of operative relation to said stapling mechanism, controlled automatically by the actuation of said stapling mechanism, whereby the form is automatically moved into and out of operative relation to said mechanism.

12. A structure as specified in claim 11, in combination with means bearing against the smaller end of said basket form during the operation of stapling the basket thereon, cooperating with said automatic devices to stop the rotation of the finished basket, whereby said lateral movement of the form is necessary in order to secure clearance for the free removal of the finished basket from said form.

13. A structure as specified in claim 11, in combination with stationary means to bear against the smaller end of the basket form during the stapling of the basket thereon, cooperating with said automatic devices to stop the rotation of the finished basket, having frictional engagement therewith, whereby said lateral motion of the form is necessary in order to prevent said stationary means from interfering with the removal of the finished basket from said form.

14. In a machine for making receptacles, the combination of stapling mechanism, a turntable, forms mounted on said turntable, adapted to be brought successively into operative relation to said mechanism, instrumentalities whereby to operate said mechanism and intermittently rotate each form during the operation of stapling the receptacle thereon, devices for intermittently rotating said turntable about a vertically disposed axis, said axis and the axes of the forms being parallel, and power transmitting connections for operating said instrumentalities and said devices in such timed relation that said turntable is stationary while each form is co-operating with said mechanism, said power transmitting connections being controlled automatically to stop the stapling mechanism and start the turntable each time a basket is finished, and whereby said turntable is partially rotated to move the finished receptacle into unloading position and to substitute the next loaded form therefor in position to cooperate with said mechanism.

15. A structure as specified in claim 14, in combination with stationary means adapted to bear upon the upper end of each form, having frictional contact therewith, and means whereby said instrumentalities for intermittently rotating each form are automatically rendered operative by the arrival of a loaded form in operative relation to said mechanism.

16. A structure as specified in claim 14, said instrumentalities for intermittently rotating each form comprising ratchet means, and means whereby said ratchet means are automatically rendered operative by the arrival of the loaded form in operative relation to said mechanism.

17. A structure as specified in claim 14, said devices for intermittently rotating the turntable comprising means operative under said automatic control and having lost motion therein to permit said turntable to remain stationary during the time necessary to complete the rotation of each form in front of said mechanism, serving to lock the turntable against rotation during the stapling of each receptacle.

18. A structure as specified in claim 14, said instrumentalities for intermittently rotating each form comprising a ratchet wheel for each form, a ratchet dog mounted in stationary operating position to successively engage said ratchet wheels, whereby each ratchet wheel is operative under said automatic control and is automatically brought into operative relation to said ratchet dog by the rotation of the turntable, and means for operating said ratchet dog by the operation of said stapling mechanism.

19. A structure as specified in claim 14, said instrumentalities for operating said stapling mechanism comprising a vertically disposed shaft having an eccentric device thereon to reciprocate said stapling mechanism, a wire feed device to feed wire to said stapling mechanism, and means on said eccentric device to operate said wire feed devices.

20. In a machine for making receptacles, a turntable, stapling mechanism, means on said turntable to present the work to said stapling mechanism, a power transmitting clutch for the stapling mechanism, a power transmitting clutch for the turntable, an actuator for intermittently rotating the turntable, controlled by the last mentioned clutch, a rock shaft with means thereon for controlling the two clutches so that one clutch is closed while the other is open, and vice versa, whereby to automatically stop the stapling mechanism and start the turntable, and instrumentalities whereby said rock shaft is conjointly controlled by said actuator and the reciprocation of said stapling mechanism.

21. A structure as specified in claim 20, said instrumentalities comprising an arm on said rock shaft, means whereby said arm is actuated in one direction by said turntable actuator, a spring for actuating said arm in the opposite direction, a device to lock said rock shaft against actuation by said spring, and ratchet means whereby said locking device is caused to release the rock shaft for actuation by said spring when the operation of said stapling mechanism on the work is completed, thereby to open the stapler clutch and close the turntable clutch, causing the stapling mechanism to stop operating and the turntable to start rotating.

22. A structure as specified in claim 20, in combination with ratchet means operated by the actuation of the stapling mechanism to intermittently rotate the work in front of the stapling mechanism, while said turntable is standing still, said ratchet means having provisions forming part of the automatic controlling means for starting the turntable.

23. A structure as specified in claim 20, in combination with wire feed devices for said stapling mechanism, and means whereby said wire feed devices are operated by power transmitted through said stapler clutch, whereby the feeding of the wire is automatically interrupted while the turntable is in motion.

24. A structure as specified in claim 20, said instrumentalities comprising an arm on said rock shaft, a cam on said turntable actuator, means engaged by said cam to actuate said arm in one direction, a spring for actuating said arm in the other direction, a locking device to hold said rock shaft against actuation by said spring, a ratchet wheel, means on said ratchet wheel to disengage said locking device, a pawl for said ratchet wheel, and means whereby said pawl is operated by the reciprocation of said stapling mechainsm, in combination with a ratchet wheel to rotate the work in front of the stapling mechanism, having a ratchet pawl actuated automatically by the actuation of said first-mentioned pawl.

25. A structure as specified in claim 20, said means on the turntable to hold the work comprising a plurality of basket forms mounted to rotate about vertically disposed individual axes spaced equidistantly around the turntable, said actuator having one complete rotation for each basket form and being adapted by lost motion between it and said turntable to hold the turntable in stationary position while each basket form is being rotated in front of the stapling mechanism, there being means to automatically rotate each basket form in operative relation to said stapling mechanism.

26. In combination with a turntable, rotary basket forms mounted thereon to rotate about parallel and individual axes located at intervals around the turntable, automatic means to rotate the basket forms successively, means to insert fastening devices in the work during such rotation of the basket forms, automatic means to stop the fastener driving means and start the turntable each time a basket is finished and stationary friction means to bear against each basket form while being rotated, thereby to insure accurate intermittent rotation of the basket form.

27. In a basket making machine, the combination of a plurality of basket forms disposed in position to support inside top and bottom basket hoops on each form, and to support assembled staves on said hoops, stapling mechanism, means to automatically rotate the basket forms successively, in position to cooperate with said mechanism, means to automatically bring the basket forms with said staves and inside hoops successively into position to receive outer hoops, automatic means whereby to stop the stapling mechanism while one form is moving toward and another away from the stapling mechanism, and instrumentalities whereby hoop strips are fed to the loaded forms successively.

28. In a basket making machine, the combination of stapling mechanism, an eccentric device for reciprocating said mechanism, wire feeding means actuated by said eccentric device to feed wire to the stapling mechanism, a rotary basket form intermittently rotated by the actuation of said eccentric device, and automatic means to stop said device when the stapling of the basket is finished.

29. A structure as specified in claim 28, in combination with another similar basket form, and means whereby said basket forms are successively presented to said stapling mechanism, and whereby said basket forms are successively rotated by said eccentric device, so that one form may be loaded while the other form is being automatically rotated in operative relation to said stapling mechanism, whereby the basket forms are successively under control by said automatic stopping means.

30. In a machine for use in making baskets, the combination of rotary means adapted and disposed in position for supporting and accurately positioning an inside annular bottom hoop for the basket, and in position to have the converging lower ends of outwardly inclined side wall staves stapled to the annular outer surface thereof, and mechanism adapted and disposed in position for driving staples through the staves into said hoop, as the hoop is rotated in the plane thereof, said hoop positioning means being held against axial movement during its rotation, thereby serving to hold the hoop against axial displacement or movement relatively to said mechanism, during the rotation thereof, whereby the staples are all in one plane, in combination with positioning means engaging the bottom edges of the basket structure, rotatable in unison with said rotary means, said rotary means being disposed in position to rotate about a vertically disposed axis, supporting the basket upside down.

EDWARD CRAIG.